Jan. 25, 1944.   S. S. SMITH   2,339,957
PIPE LINE CONTROL SYSTEM
Filed Oct. 26, 1942   2 Sheets-Sheet 2
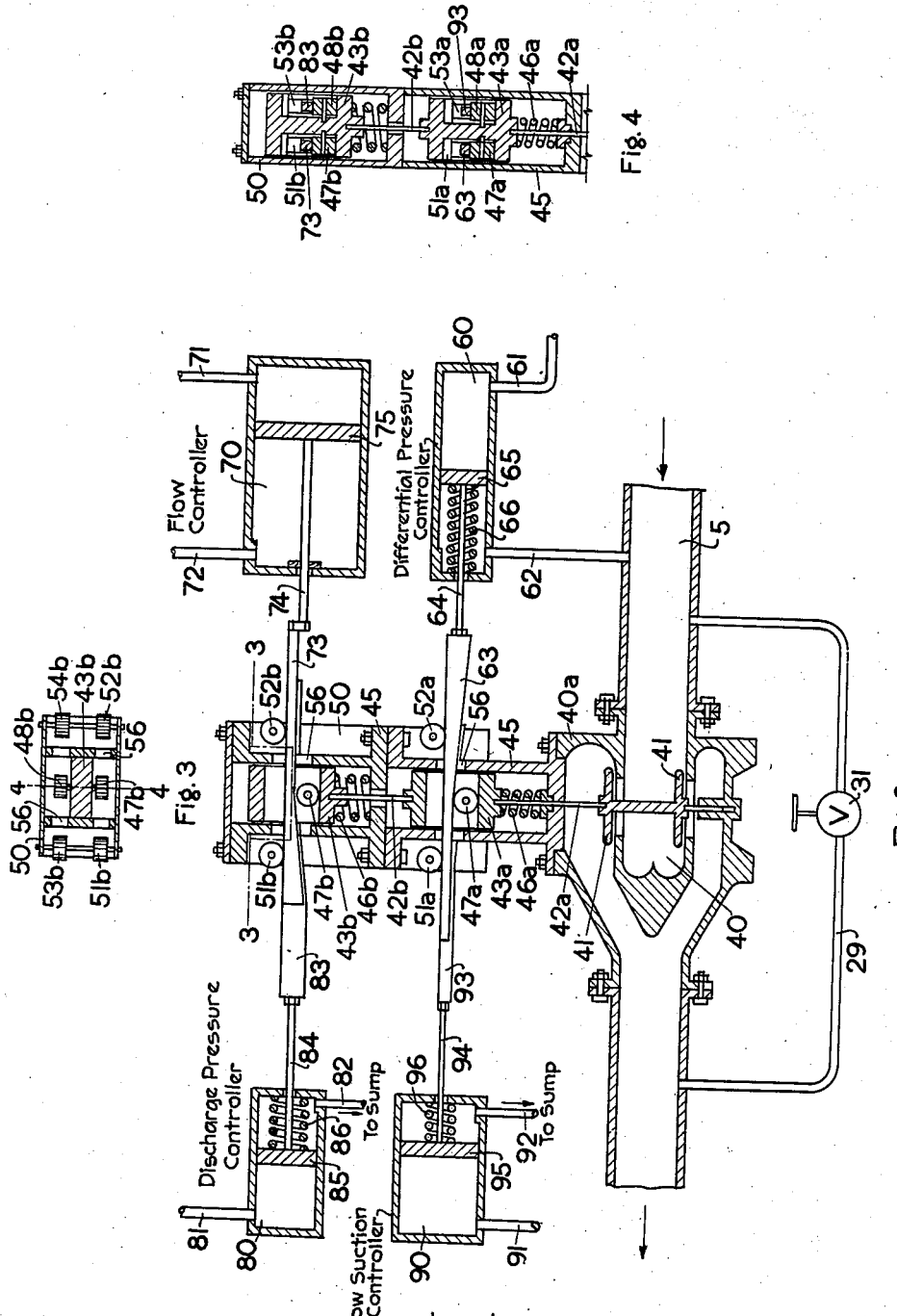
Inventor: Sydney S. Smith
By his Attorney:

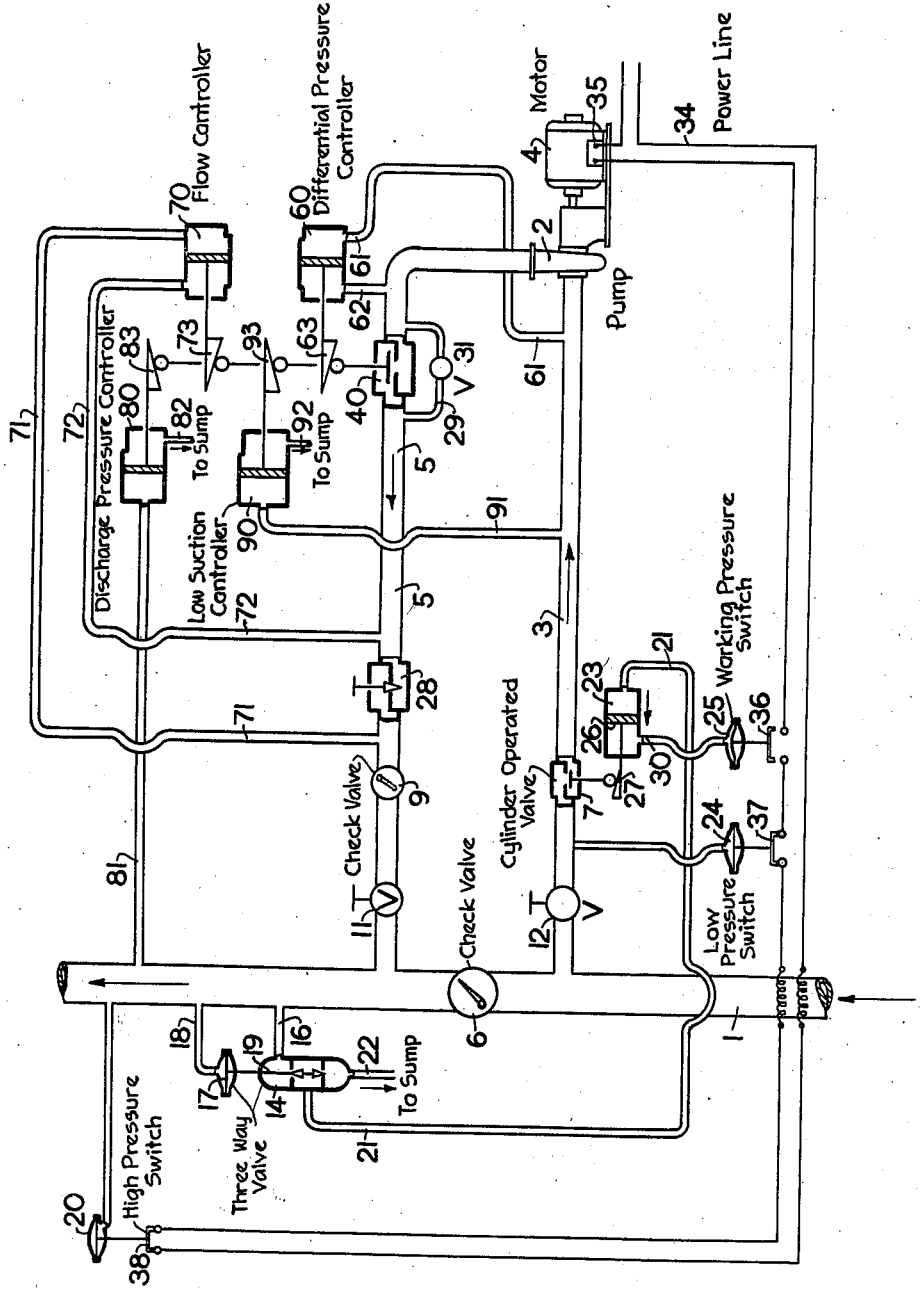
Fig. I

Patented Jan. 25, 1944

2,339,957

UNITED STATES PATENT OFFICE 2,339,957

PIPE LINE CONTROL SYSTEM

Sydney S. Smith, Scarsdale, N. Y., assignor to Shell Development Company, San Francisco, Calif., a corporation of Delaware Application October 26, 1942, Serial No. 463,448

5 Claims. (Cl. 103—25)

This invention pertains to the control of pipe lines, and relates more specifically to an automatic control system for pipe line pump stations.

It is an object of this invention to provide an automatic system for pipe line station operation, wherein a pump station is by-passed by the line flow and remains idle so long as the line pressures remain within a predetermined low range, and starts operating when the line pressure increases to a predetermined high value.

It is also an object of this invention to provide a pump station system, wherein the pump of the station remains isolated from the line by automatically controlled valves and check valves, and the prime-mover of said pump remains stationary during such times as the station is by-passed by a low pressure line flow, said valves automatically opening to admit said flow to the pump, and said prime-mover starting to drive the pump in response to an increasing incoming line flow pressure.

It is also an object of this invention to provide an automatic valve in the discharge of said pump, and a plurality of controllers therefor, whereby said discharge is caused to open to the main pipe line in response to a differential pressure created across the pump by the starting thereof, the throttling of said valve being further simultaneously controlled as a function of the discharge flow rate, and of the suction and discharge pressure values, whereby said pump is maintained at an optimum delivery rate in a range between a maximum discharge pressure and a minimum suction pressure during the operation of said pump.

These and other objects of this invention will be understood from the following description, taken with reference to the attached drawings, wherein:

Fig. 1 is a diagrammatic representation of the automatic pump station control system of the present invention;

Fig. 2 is a diagrammatic elevation view in cross-section of the main discharge valve shown in Fig. 1;

Fig. 3 is a diagrammatic plan view in cross-section taken along line III—III of Fig. 2 with the cams removed; and Fig. 4 is a cross-section view taken at right angles to that of Fig. 2.

Referring to the drawings, Fig. 1 shows a pipe line 1 by-passing a pump 2 connected thereto by a suction conduit 3 and a discharge conduit 5, a check valve 6, such as a stop-lift valve, being interposed in the pipe line intermediate said conduits to open the flow in the line, and to close to prevent recirculation at the station.

When the station pump 2 is not in operation, it remains isolated from the pipe line by a normally closed cylinder operated valve 7 in its suction conduit, and a check valve 9 in its discharge conduit, gate valves being further provided, if desired, in said conduits for manual operation, as shown at 11 and 12, respectively.

A three-way valve 14 is connected with the pipe line by means of a conduit 16, and is controlled by a diaphragm mechanism 17, which is actuated by pipe line pressure through a conduit 18.

A diaphragm-controlled stem 19 actuates the three-way valve 14 to establish communication either between the conduit 16 and a conduit 21, or between the conduit 21 and a conduit 22, leading to the pump station sump (not shown).

The conduit 21 opens to the cylinder 23, containing a piston 26, adapted to open the normally closed cylinder controlled valve 7 by means of a suitable transmission mechanism such as symbolically shown by a cam 27.

The discharge of the pump 2 is provided with a main discharge valve 40 which is subject to regulation by four independent controllers, namely: a pump differential pressure controller 60, connected to the suction and the discharge of the pump 2 by conduits 61 and 62, respectively; a flow controller 70, connected to the low and the high pressure sides of an orifice 28 in the discharge line by conduits 71 and 72, respectively; a discharge pressure controller 80 connected at a suitable point to the pump discharge side by conduit 81; and a low suction controller 90, connected to the pump suction side by conduit 91.

A by-pass 29, provided with a valve 31, is connected across the main valve 40.

As shown in greater detail in Figs. 2, 3 and 4, where elements identical with those of Fig. 1 are denoted by the same numerals, the main discharge valve 40 comprises a valve housing 40a, forming a seat adapted to be closed by a valve member 41.

The valve member 41 is actuated by a stem 42a, forming part of an assembly comprising a plunger member 43a, rigidly connected by means of a second stem 42b with a second plunger member 43b, as more clearly shown in Fig. 4.

The assembly 43a—43b is adapted for vertical motion within a structure 45, supported on the valve housing 40a, said assembly being urged upward, in such a manner as to open the valve, by means of springs 46a and 46b.

The cross-section of the plungers 43 is shaped in the form of a double T, and each of said plungers carries rollers attached to its central narrowed portion, such as shown at 47a, 47b, 48a and 48b in the drawings.

The plates 50 of the supporting structure 45 are likewise provided with rollers 51a, 51b, 52a, 52b, 53a, 53b, 54a and 54b attached thereto. These rollers, as shown in the drawings, are staggered in a vertical plane, and are in alignment in a horizontal plane, respectively, with the rollers 47 and 48 affixed to the plunger body. Windows 56 are provided in the walls of the supporting structure 45, whereby cams 63, 73, 83 and 93 can be inserted between the stationary rollers 51, 52, 53 and 54 and the plunger rollers 47 and 48, which plunger rollers are vertically movable, together with the assembly of the plungers 43, with regard to the stationary rollers by the wedgeing action of the cams inserted therebetween.

The cams 63, 73, 83 and 93 are connected, by means of stems 64, 74, 84 and 94, to the pistons 65, 75, 85 and 95 of the differential pressure controller 60, the flow controller 70, the discharge pressure controller 80 and the low suction controller 90, which are in communication, by means of pipes 61, 62, 71, 72, 81, 82, 91 and 92 with the fluid filling the system, or with the sump, at points defined hereinabove with regard to Fig. 1.

The motion of the piston of each controller cylinder is responsive to the pressure differential obtaining across said piston, the pressure-responsive motion of said pistons being furthermore opposed or helped by springs 66, 86 and 96 within said controller cylinders, cylinder 70 having no spring.

Each of the cams 63, 73, 83 and 93 has a reduced and an enlarged portion in a vertical plane.

When the pressure-responsive or the spring-responsive motion of any of the pistons 65, 75, 85 and 95 acts to wedge the enlarged portion of any of the cams between the stationary rollers and the plunger rollers, the plunger rollers are depressed downwards, moving the plunger assembly as a whole to close the valve 40. When the reduced portions of all the cams are in register between the stationary and the plunger rollers, the action of the springs 46a and 46b lifts the plunger assembly and opens the valve 40.

Thus, any one of the controllers is able to regulate the opening of the valve 40 in a degree predetermined by the selected size and shape of the cam on said controller, and the force of the spring in said controller.

Referring again to Fig. 1, the pump 2 is driven by a motor 4, such as an electric motor operating on a power line 34. The supply of electric power to the motor is controlled by switches 35, such as pump and motor temperature-responsive switches, a working pressure switch 36, controlled through a diaphragm mechanism 25 in a manner to be described hereinbelow, a low suction pressure switch 37, controlled through a diaphragm mechanism 24, and a high pressure switch 38, similarly controlled through a diaphragm mechanism 20.

All these switches are connected in the power line in series, so that the opening of any one switch is sufficient to break the circuit, thereby stopping the motor and the pump.

The operation of the present system may be briefly described as follows:

When the station shown in Fig. 1 is idle, the fluid flows therethrough along line 1 in the direction indicated by the arrow, the check valve 6 and valves 11 and 12 being open, and the pump 2 being isolated from the line on the suction side by the cylinder-operated valve 7, which is closed, and on the discharge side by the check valve 9. Switches 35, 37 and 38 are normally closed, but the working pressure switch 36 is open, the motor 4 remaining therefore stationary.

When the next station upstream of the station shown in Fig. 1 increases pressure by pumping therethrough, and said pressure increase reaches a predetermined value to which the diaphragm mechanism 17, governing the three-way valve 14, has been set, such for example, as 450 lbs., the three-way valve 14 opens to admit the line pressure fluid to the cylinder 23. The motion of the cylinder piston 26 causes the cylinder-operated valve 7 to open, admitting the line fluid to the pump 2. When the piston 20 moves to its extreme position, it unmasks a port and line 30 leading to the diaphragm mechanism 25, and admits pressure fluid to said mechanism, thereby causing switch 36 to close and starting the motor 4.

As the motor 4 comes up to speed, the pump, which had been filled with fluid by the opening of the cylinder-operated valve 7, creates a working pressure differential between its suction and pressure sides, which actuates, through lines 61 and 62, the differential pressure controller 60, causing the piston 65 and cam 63 of said controller to move so as to open the main discharge valve 40, thus establishing flow through the orifice 28 and check valve 9 in line 5.

As the cam 63 of the differential pressure controller 60 continues to move, increasing the aperture of the valve 40, a flow pressure differential is created across the orifice 28, which is sufficient to actuate the piston 75 of the flow controller 70 through lines 71 and 72. As this piston moves, the cam 73 depresses the valve assembly 43, tending to decrease the aperture of the valve 40, and thus establishing a rate of flow which corresponds to a proper pressure differential across the orifice 28. The function of the flow controller 70 is thus to prevent overloading the motor 4 during the period required to pull down the incoming line pressure.

As the rate of pumping catches up with the rate of flow in the line, the suction pressure begins to decrease, and is finally lowered down to a point where the low pressure suction controller 90 is actuated, through line 91, to retract its piston 95 and cam 93, tending further to close the valve 40.

When this condition is attained, the pump 2 runs in normal operation, the valve 40 being throttled just sufficiently to maintain a suction pressure adequate to give proper control.

If at any time the line resistance downstream of the station increases sufficiently to raise the discharge pressure of the pump 2 to a level predetermined by the setting of the discharge pressure controller 80, this controller is actuated, through line 81, to move its piston 85 and cam 83 to close the valve 40, whereby the discharge pressure is maintained at a level such that maximum safe working pressures in the pipe line are not over-stressed.

During all of these operations, a small amount of fluid continues to flow through the line 29, by-passing the main valve 40. This flow acts to cool the pump during the starting period, and also operates to over-extend the pressures upwards on the discharge side and downwards on the suction side at any time the line is closed downstream or upstream, respectively. In either of these events, if the suction pressure falls to a predetermined value, such for example, as 20 lbs., at which the low pressure switch 37 had been pre-set to operate, the diaphragm mechanism 24 opens this switch, thereby stopping the motor and the pump. In a similar manner, if the discharge pressure exceeds a predetermined high value, such, for example, as 1000 lbs., the diaphragm mechanism 26 opens the high pressure switch 38, stopping the motor.

If a motor other than an electric motor is used to drive the pump 2, the switches 35, 36, 37 and 38 may be placed in any electrical circuit auxiliary to the operation of said motor, for example, in the ignition circuit of a gasoline engine or in a relay circuit controlling the injection of a Diesel engine, whereby the opening of any of said valves results in stopping the motor.

When the pump 2 is stopped, and the discharge pressure falls below the value, such for example, as 450 lbs., to which the diaphragm mechanism 17 controlling the three-way valve 14 had been adjusted, said mechanism reverses the connections of the three-way valve and permits the fluid from the cylinder 23 to drain to the pump station sump through pipes 21 and 22. Any fluid which may leak past the pistons 85 and 95 in controller cylinders 80 and 90 is similarly drained to the sump through pipes 82 and 92, respectively.

When the cylinder 23 is drained of fluid, the cylinder-operated valve 7 closes, isolating the suction side of the pump from the line 1, while the discharge side is similarly isolated therefrom by the check valve 9.

I claim as my invention:

1. In a pipe line system, the combination of a pipe line, a pump, a suction conduit and a discharge conduit in fluid communication between said pump and the pipe line, a normally closed controlled valve in each of said conduits, means responsive to a predetermined rising pressure value in the pipe line for opening the controlled valve in the suction conduit, means responsive to the opening of said valve for starting the pump, and means responsive to the pressure differential obtaining between the discharge and the suction side of said pump upon starting for opening the controlled valve in the discharge conduit.

2. In a pipe line system, the combination of a pipe line, a pump, a suction conduit and a discharge conduit in fluid communication between said pump and the pipe line, a normally closed controlled valve in each of said conduits, means responsive to a predetermined rising pressure value in the pipe line for opening the controlled valve in the suction conduit, means responsive to the opening of said valve for starting the pump, means responsive to the pressure differential obtaining between the discharge and the suction side of said pump upon starting for opening the controlled valve in the discharge conduit, means responsive to the rate of flow in the discharge conduit for regulating the opening of said valve, means responsive to a predetermined high pressure value on the discharge side of said pump for restricting the aperture of said valve, and means responsive to a predetermined low pressure valve on the suction side of said pump for restricting the aperture of said valve, whereby the pump is maintained at a predetermined delivery rate in a range between a maximum discharge pressure and a minimum suction pressure during the operation of said pump.

3. In a pipe line system, the combination of a pipe line, a pump, a suction conduit and a discharge conduit in fluid communication between said pump and the pipe line, a normally closed controlled valve in each of said conduits, a cylinder, a piston adapted for motion within said cylinder, valved conduit means between said cylinder and the pipe line, control means responsive to a predetermined rising pressure value in said pipe line for admitting pipe line fluid through said valved means to said cylinder, thereby displacing said piston, means actuated by the displacement of said piston for opening the controlled valve in the pump suction conduit, means responsive to an extreme displacement of said piston under the effect of the pressure fluid for starting the pump, a second cylinder and a piston adapted for motion therein, conduits in fluid communication between the suction and the discharge of the pump and said cylinder on either side of said piston, and means actuated by said piston for opening the controlled valve in the discharge conduit of the pumps when said piston is displaced by the pressure differential obtaining between the suction and the discharge side of said pump upon starting.

4. In a pipe line system, the combination of a pipe line, a pump, a suction conduit between the pipe line and the pump, a normally closed controlled valve in said conduit, means responsive to a predetermined rising pressure value in the pipe line for opening said valve, means responsive to the opening of said valve for starting the pump, a discharge conduit between the pump and the pipe line, a controlled valve in said conduit, spring means normally tending to close said valve, cam means responsive to an increasing pressure differential between the discharge and the suction side of said pump adapted to open said valve, cam means responsive to an increasing rate of flow in the discharge conduit adapted to restrict the aperture of said valve, cam means responsive to a predetermined high pressure value on the discharge side of the pump adapted to restrict the aperture of said valve, and cam means responsive to a predetremined low pressure value on the suction side of the pump adapted to restrict the aperture of said valve, whereby the pump is maintained at a predetermined delivery rate in a range between a maximum discharge pressure and a minimum suction pressure during the operation of said pump.

5. In a pipe line system, the combination of a pipe line, a pump, conduit means in fluid communication between said pipe line and said pump, a control valve in said conduit means, cam means regulating the aperture of said valve, piston means actuating said cam means, and cylinder means in fluid communication with said conduit means, said piston means being movable within said cylinder means in response to pressure variations within said conduit means, whereby the delivery rate of said pump is controlled by said valve within a predetermined pressure range.

SYDNEY S. SMITH.